United States Patent

[11] 3,568,085

[72] Inventor Vladimir J. Pimenoff
Scarborough, Ontario, Canada
[21] Appl. No. 765,335
[22] Filed Oct. 7, 1968
[45] Patented Mar. 2, 1971
[73] Assignee Collins Radio Company of Canada Ltd.
Cedar Rapids, Iowa

[54] FREQUENCY SHORT INTERVAL SAMPLE AND LONG PERIOD FREQUENCY HOLD CIRCUIT

11 Claims, 5 Drawing Figs.

[52] U.S. Cl. 331/14, 325/20, 328/151, 330/9, 330/51, 330/85, 330/86, 331/17, 331/18, 331/25
[51] Int. Cl. H03b 3/04, H03f 1/34, H03f 3/68
[50] Field of Search 331/14, 17, 18, 25, 34; 330/9, 85, 86, 51, 103; 325/420, 427; 328/151

[56] References Cited
UNITED STATES PATENTS

| | | | |
|---|---|---|---|
| 3,304,507 | 2/1967 | Weekes et al. | 328/151 |
| 3,381,231 | 4/1968 | Gilbert | 328/151 |
| 3,392,345 | 7/1968 | Young | 330/51 |
| 3,421,105 | 1/1969 | Taylor | 331/17X |

*Primary Examiner*—Roy Lake
*Assistant Examiner*—Siegfried H. Grimm
*Attorneys*—Warren H. Kintzinger and Robert J. Crawford

ABSTRACT: A frequency determined voltage short interval sample and long period frequency hold circuit with a dual feedback amplifier circuit alternatively switchable between a first feedback path with simultaneous connection for sampling an input signal voltage and a second feedback path for relatively long hold intervals; and with the first feedback path providing normal gain during the relatively short sample intervals and with the second feedback path including an amplifier and providing substantially zero gain around the amplifier loop.

PATENTED MAR 2 1971

3,568,085

SHEET 1 OF 2

Figures 1, 2, 3:
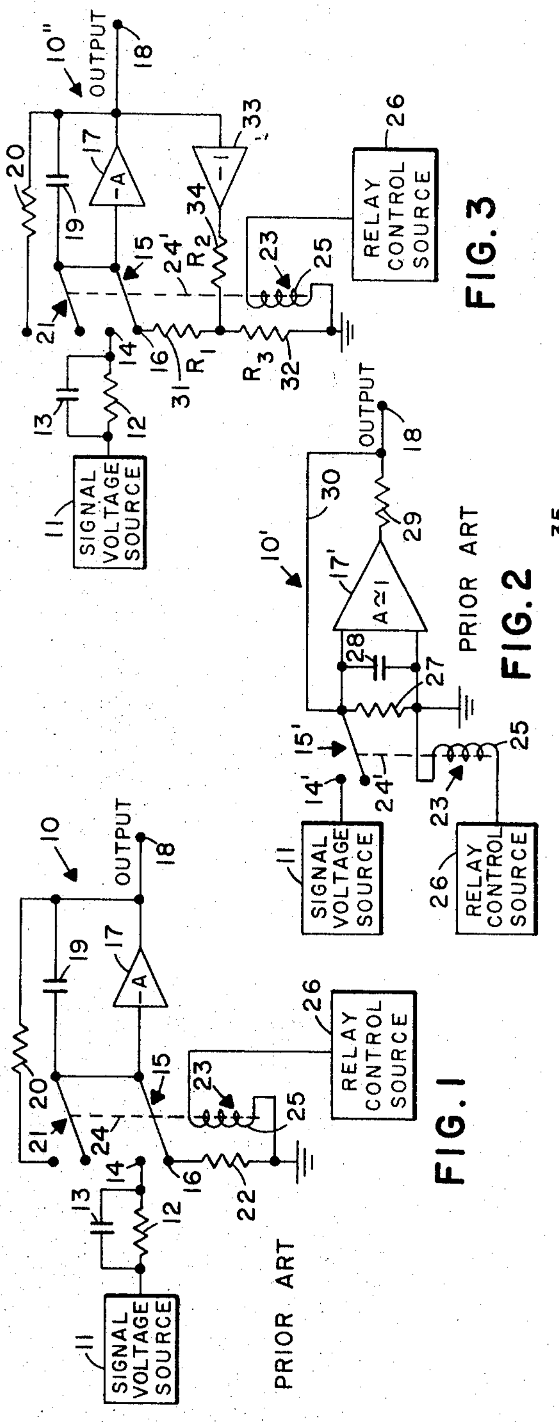

INVENTOR.
VLADIMIR J. PIMENOFF

BY Warren H. Kintzinger
ATTORNEY

INVENTOR.
VALDIMIR J. PIMENOFF

BY Warren H. Kinkinger
ATTORNEY

FREQUENCY SHORT INTERVAL SAMPLE AND LONG PERIOD FREQUENCY HOLD CIRCUIT

This invention relates in general to signal voltage sample and hold circuits, and in particular, to a signal voltage short interval sample and long period frequency hold circuit.

Power consumption with various radio equipments, particularly with, for example, man pack sets, airborne and space radio systems, is a significant problem. An approach to eliminating this problem to at least some extent lies in operation of a stabilized master oscillator (SMO) of a radio system intermittently instead of continuously in order to decrease power consumption. In one radio system, for example, power consumption of the counting circuits in the SMO is approximately 4 watts, due to high-speed requirements imposed. Since with one particular radio system the receive-transmit duty cycle is 9:1 and since the power required to run the receiver circuitry apart from the SMO is less than one-half of a watt, considerable power savings are obtainable through operating the SMO intermittently.

It is, therefore, a principal object of this invention to provide for the conservation of power in radio systems.

Another object in such radio systems is to attain a marked improvement in system power requirements through intermittent SMO operation instead of continuous operation.

A further object with such intermittent SMO operation is to provide operationally short interval signal voltage sampling periods and, relatively, almost infinitely long frequency hold periods.

Features of this invention useful in accomplishing the above objects include, in an improved signal voltage short interval sample and relatively long time constant long period voltage value hold circuit, a dual feedback amplifier wherein the input of the amplifier is alternatively switched between a first feedback path providing normal gain during sample intervals and a second feedback path for the hold intervals, and with the second feedback path for the long time constant hold intervals providing substantially zero gain around the loop.

A specific embodiment representing what is currently regarded as the best mode for carrying out this invention is illustrated in the accompanying drawings.

Figure 4:
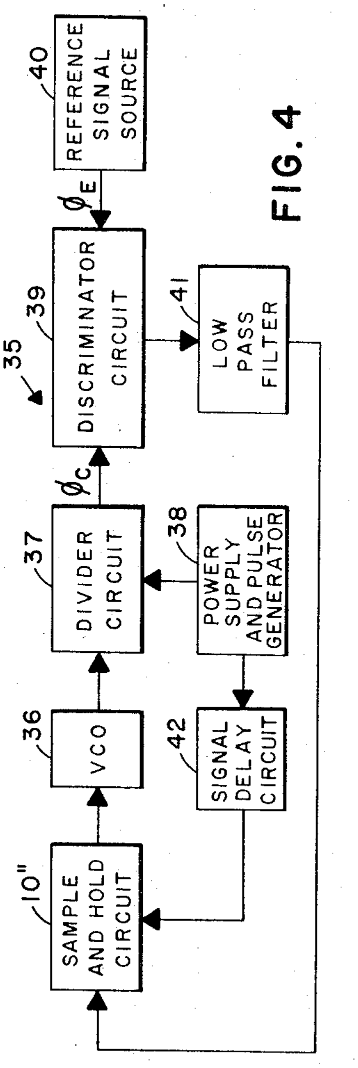
Figure 5:
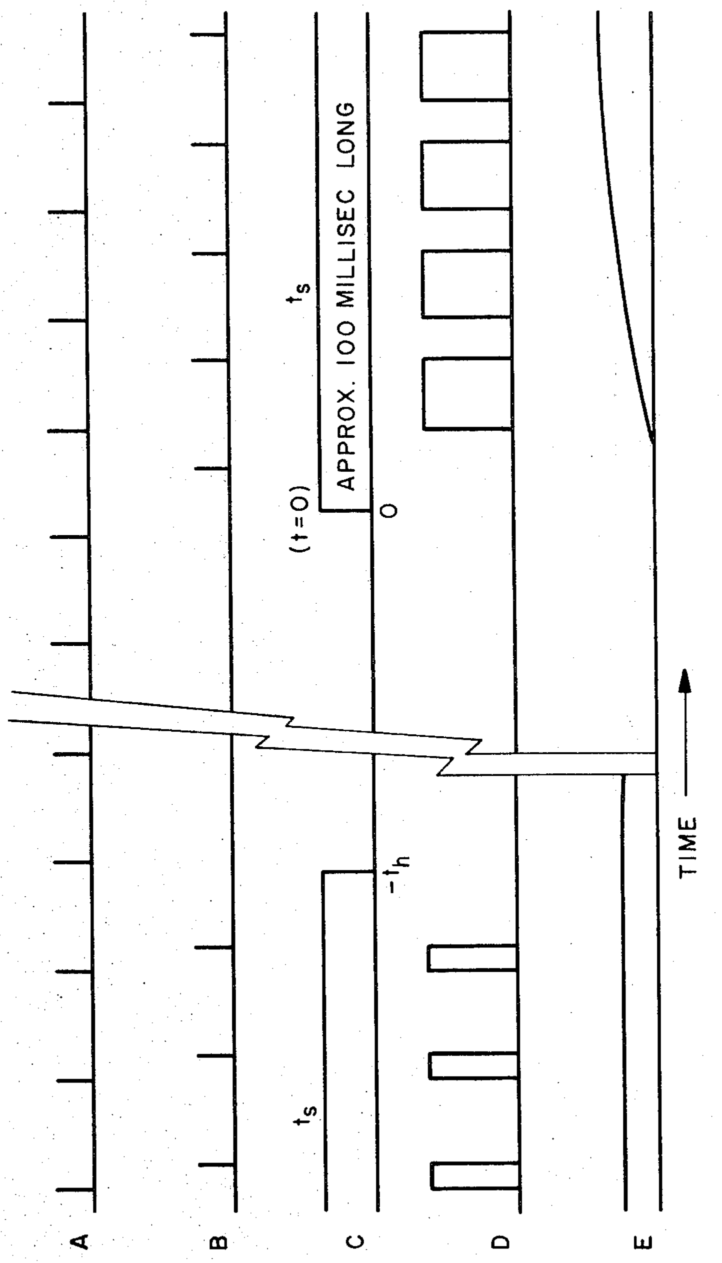

In the drawings:

FIG. 1 represents a prior art sample and hold circuit using an RC network and an amplifier with the gain of −A in what is essentially a Miller integrator circuit;

FIG. 2, another prior art sample and hold circuit making use of positive feedback in a bootstrap circuit having substantially an infinite time constant;

FIG. 3, applicant's improved signal voltage frequency short interval sample and long period frequency hold circuit;

FIG. 4, a block diagram of a stabilized master oscillator (SMO) utilizing the improved sample and hold circuit of FIG. 3; and FIG. 5, a graph of signal pulse waveforms at various points in the SMO of FIG. 4.

Referring to the drawings:

The prior art sample and hold circuit 10 of FIG. 1 is provided with an input from signal source 11 through resistor 12 and capacitor 13 connected in parallel to an input signal sample terminal 14. Switch 15 is movable between contact with a hold terminal 16 and the signal sample terminal 14 for alternatively connecting either of the terminals 14 or 16 to the input of amplifier 17. Amplifier 17 has an output connection to output signal terminal 18 and also a feedback circuit including connection from the output from the amplifier 17 through capacitor 19 to the input of amplifier 17 and also additionally through resistor 20 in parallel with capacitor 19 when a second switch 21 is switched from the circuit open "hold" state to a closed circuit "sample" state. The hold terminal 16 of switch 15 is connected through resistor 22 to ground. A switch relay 23 is provided having a mechanical drive 24 to relay switches 15 and 21, and with the relay activating coil 25 having connection at one end to relay signal control source 26 and at the other end to ground. Please note that electronic switches are sometimes used in place of the relay switches 15 and 21 in some such prior art circuits.

With the prior art sample and hold circuit 10' of FIG. 2, signal source 11 is connected to input signal sample terminal 14' and through switch 15' when it is closed to the "sample" state from the open "hold" state as an input to amplifier 17'. The input to amplifier 17' is connected through resistor 27 and capacitor 28 in parallel to ground, and the amplifier 17' is also provided with a ground connection. The output of amplifier 17' is connected through resistor 29 to output terminal 18 and also back from the connection between resistor 29 and output terminal 18 through a line 30 to the input of amplifier 17'. This sample and hold circuit, as a positive feedback bootstrap type circuit, also utilizes a switching relay 23, much the same as with the circuit of FIG. 1, including a coil 25, relay control source 26 and a mechanical drive connection 24' to a single switch 15'.

Referring now to applicant's improved frequency signal voltage short interval sample and long period frequency hold circuit 10'', please note that components the same as shown with the circuits of FIGS. 1 and 2 are numbered the same and those with slight modifications are given primed numbers. It is of interest to note at this point that when applicant's frequency signal voltage short interval sample and long period frequency hold circuit of FIG. 3 is activated to the voltage "-sample" state from the hold switch position illustrated, that the active portion of the circuit for that state is exactly the same as the active portion of the prior art circuit of FIG. 1 for the switch activated signal voltage sample state thereof. Applicant's sample and hold circuit 10'', however, is provided with two series connected resistors 31 and 32 connected between the hold terminal 16 of switch 15 and ground. The circuit also includes a second amplifier 33 in a feedback path with the input of amplifier 33 connected to the output of amplifier 17 and the output of amplifier 33 connected through resistor 34 to the common junction of resistors 31 and 32. The gain of amplifier 33 is such in this loop as to provide, through this second feedback path, for long time constant hold intervals with substantially zero gain around the loop.

Referring now to the block diagram of FIG. 4, a stabilized master oscillator (SMO) 35 is shown utilizing the applicant's voltage sample and hold circuit 10'' of FIG. 3. The output of voltage sample and hold circuit 10'' is connected as an input to voltage controlled oscillator 36, the output from which is applied as input to divider circuit 37. Divider circuit 37 receives an additional input from power supply and pulse generator 38 in order to develop an output applied as an input to discriminator circuit 39. An additional input to discriminator circuit 39 is supplied from reference signal source 40. The output of discriminator circuit 39 is passed through low-pass filter 41 and applied as the input signal source voltage that is repeatedly sampled by the voltage sample and hold circuit 10''. The power supply and pulse generator 38 provides a pulse signal output to and through signal delay circuit 42 as a relay switch controlling signal relay control source 26 input to the voltage sample and hold circuit 10''. Here again, please note that the signal output of signal delay circuit 42 could activate and deactivate electronic switches in place of the switches 15 and 21 of the voltage sample and hold circuit of FIG. 3 in providing the desired sample and hold cycle switching action.

In order that the improved voltage sample and hold circuit 10'' of FIG. 3 may be better understood, both as to operational functioning and circuit structure as it may find operational use with, for example, the SMO circuit 35 of FIG. 4 and also with reference to prior art voltage sample and hold circuits such as shown in FIGS. 1 and 2, please consider the following outlined terms:

$A$ = Gain of amplifier $A'$ = Gain of amplifier to make $T = \infty$ $f_i$ = "instantaneous" frequency out of VCO $f_o$ = VCO frequency $\Delta f_o$ = Change in $f_o$ during hold period
$\Delta f_o'$ = Change in $f_o$ as a result of switching from hold to sample
$K\Phi$ Discriminator constant in volts/radian
$K_v$ = VCO sensitivity (varies between 1 and 4 mHz. per volt)
$k$ = Drift rate of VCO in cycles/sec$^2$
$N$ = Division Ratio (varies between 7,800 and 16,000 but taken as 10,000 for rough calculations)
$t_1$ = Delay of Block 42, FIG. 4 = time difference between the moment at which Block 37 is switched ON and moment at which block 10'' is switched from the hold to the sample position
$t_h$ = Hold time
$t_s$ = Sample time
$t_p$ = Time between two successive pulses out of standard reference = .12 m sec.
$T$ = Sample period = $t_s + t_h$
$V_c$ = Voltage into VCO
$\Delta V_c$ = Change in $V_c$ as a result of switching from hold to sample
$\alpha$ = Duty cycle for counters = $\frac{t_s}{T}$ $\gamma$ = Fractional change in gain = $\frac{A-A'}{A}$ $\Phi = \Phi_c - \Phi_E$
$\Phi_c$ = Phase out of divider
$\Phi_E$ = Phase out of Block 40, FIG. 4.

With the SMO circuit 35 of FIG. 4, the greatest VCO 36 sensitivity $K_v$ happens to be about 4 mHz. per volt and this maximum sensitivity occurs at a $V_c$ equal to approximately 2 volts for the particular voltage control oscillator 36 employed. Assuming that the maximum frequency drift that may be tolerated between sampling periods is approximately 1 kc. injected and mixed, and that, this as a consequence corresponds to approximately 330 Hz. out of VCO 36, or a $\Delta V_c$ of approximately .1 millivolt as substantiated by the formula $$\Delta V_c = \frac{333\times 10^{-6}}{4.0} = 0.083 \text{ millivolts}$$

The SMO circuit 35 of FIG. 4 produces the waveforms shown in FIG. 5 with waveform A being the reference signal pulse waveform from reference signal source 40, waveform B being the pulse waveform appearing at the output of divider circuit 37, waveform C the pulse waveform developed by power supply and pulse generator circuit 38, waveform D the pulse waveform output from discriminator circuit 39, and waveform E the resulting waveform output from low-pass filter circuit 41.

With an SMO system 35, such as shown in FIG. 4, using a voltage sample and hold circuit such as shown in FIG. 3, the sample time $t_s$ has to be of a duration as long as possibly 100 milliseconds to provide sufficient time for the loop to stabilize. Assuming a duty cycle of $\alpha$ = to 0.1, this would make $t_h$ equal to approximately 900 milliseconds. With such parameter values as $t_h$ equal to 900 milliseconds, $V_c$ equal to 2 volts, and $\Delta V_c$ equal to 0.0001 volt, the value of the time constant for the hold circuit comes out to be approximately 18,000 seconds or 5 hours. Referring back to the prior art voltage sample and hold circuit of FIG. 1 that uses an RC network and an amplifier having gain of −A, a Miller integrator-type circuit is provided having an output voltage $E_o$ decaying at a rate having a time constant of:

$$T = \text{RCA} \qquad (1)$$

Obviously, this is a result that cannot be made to equal anything like the 18,000 seconds or 5 hours noted hereinbefore.

The positive feedback bootstrap type sample and hold circuit 10' of FIG. 2 while possibly providing an infinite time constant does have at least two disadvantages of note. One of these disadvantages is that the input impedance in the sample position is simply the impedance due to the capacitance $C$ of capacitor 28 with the amplifier and resistance network effectively being to remove resistive component of the input impedance. With reference to another disadvantage, the time constant for the prior art circuit of FIG. 2 is given by $$T = \frac{CR_2}{(A-1)-\frac{R_2}{R_1}} = \frac{CR_2}{\gamma} \qquad (2)$$

where $\gamma$ is the fractional change in gain from the value factors that make $T$ equal to $\infty$, that is, from the value $$A' = 1 + \frac{R_2}{R_1}$$

and since $A$ is approximately equal to 1, $\gamma = A - A''$. Thus if $T$ turns out to be large, the value of $A$ is extremely critical. Consider, for example, with assumed values $T = 10^4$, $r_1 = 10^6$, $R_2 = 10^3$, $C = 10^{-7}$, that the value of $\gamma$ works out to be $10^{-8}$, and that, therefore, gain must differ from 1.001 by no more than one part in $10^8$. So obviously, the prior art circuit of FIG. 2 is unsatisfactory for any value of $T$ in the order of $10^4$.

Referring again to applicant's improved sample and hold circuit 10'' of FIG. 3 with resistor 31 connected from the hold terminal 16 to the junction of resistor 32 and 34 and with resistor 32 connected at its other end to ground, that for this particular circuit in the hold position switched state of operation $$T = \frac{RAC}{\gamma} \qquad (3)$$

$$\text{and } T = \infty \text{ when } A = \frac{R_2}{R_3} + 1$$

In comparing equation (3) with equation (2), it is seen that the time constant is increased by factor $A$ and assuming $A = 10^3$, $R_1 = 10^8$, $C = 10^{-7}$, and $\gamma = 0.1$, then $$T = \frac{RAC}{\gamma} = 10^{8+3-7+1} = 10^5 = 100{,}000 \text{ seconds}$$

with $\gamma$ as defined hereinbefore, in other words $$\gamma = \frac{A-A'}{A}$$

and since for this circuit $A$ is not equal to 1, $\gamma$ cannot be taken as just simply $A-A'$. It thereby appears that the circuit is quite capable of the required time constant. In other words, the sample and hold circuit 10'' is particularly suitable for use in any application where a high quality sample and hold circuit is required covering a vast range of utilization including instrumentation, analogue computation, control circuits and many other uses. The sample and hold circuit 10'' normally samples a DC voltage level at the input terminal 14 and with its exceedingly long time constant provides through a relatively long hold period a substantially continuous extension of the voltage sample which as a DC voltage input to a voltage controlled oscillator 36 as employed in the SMO system 35 of FIG. 4 represents a frequency sample signal held for injection and control of the voltage controlled oscillator 36.

With operation of an SMO system 35 as shown in FIG. 4, utilizing the sample and hold circuit 10'', the power supply and pulse generator 38 puts out a pulse of width $t_s$ about once a second with such a relatively broad extended pulse $t_s$ as indicated by waveform C of the graph of FIG. 5. When the leading edge of this pulse occurs the counter elements of the SMO circuit 35 are turned on at $t$ equal to zero. The sample and hold circuit 10'' is ultimately turned "on" at a time $t_1$ equal to the delay of signal delay circuit 42 from the start of each respective pulse of waveform C and with the delay through signal delay circuit 42 being about 10 milliseconds. Such a 10 milliseconds delay should generally be ample time for the output of low-pass filter 41 to stabilize from the initiation of each waveform C pulse signal. Such a stabilization period is beneficial since normally the output of the low-pass filter 41 bears no specific relation to the output of the sample and hold circuit 10'' due to the fact that the phase relation between passes out of the reference signal source 40 and the divider circuit 37 is lost during each "off" period as may be seen by reference to the waveforms of FIG. 5. There are two reasons for this, one being that during the "off" period $t_h$ is an arbitrary time and not an integral number of reference pulse periods. Secondly, even if $t_h = N\,t_r$, with N being an integer, the phase relation would still be lost due to the fact that the counter action in the SMO would not pick up the count of $t$ equal to zero where it left off at $t$ equal to $-t_h$. One possible way the first could be overcome would be by providing a sync connection from the reference signal source 40 to the power supply and pulse generator 38 with respect to the first difficulty pointed out hereinabove. Referring again to the signal delay circuit 42, the output of low-pass filter 41 is allowed to stabilize before application thereof to the voltage control oscillator 36 via the sample and hold circuit 10'' to thereby decrease the duration of the sample and hold circuit 10''. While SMO 35 of FIG. 4 has a relatively long stabilization time up to as high as 100 milliseconds due to loss of phase information ($\Phi_c - \Phi_E$) during the hold period, it is advantageously a relatively simple, very useful, power conserving SMO system quite advantageously usable in many receiver and/or receiver-transmitter systems.

Whereas this invention here illustrated and described with respect to a single embodiment thereof, it should be realized that various changes may be made without departing from the essential contributions to the art made by the teachings hereof.

I claim:

1. In a voltage sample and hold circuit, a voltage source subject to being sampled; an amplifier circuit with two feedback circuits, a first feedback circuit providing normal gain during a voltage sample state of operation, and a second feedback circuit establishing substantially zero gain around its amplifier loop during a voltage hold state of operation; and switch means connected to both said first and second feedback circuits and to said voltage source alternatively switchable to close said first and second feedback circuits; and said switch means connecting said voltage source to said amplifier circuit when said switch means is in the sample state of operation and said first feedback circuit is closed for normal gain.

2. The voltage sample and hold circuit of claim 1 wherein, the amplifier circuit includes amplifier staging having an input and an output, and capacitive means continually connected between said input and output of said amplifier staging.

3. The voltage sample and hold circuit of claim 2 wherein, said first feedback circuit includes resistive means subject to being connected in parallel with said capacitive means when said switch means closes said first feedback circuit for the sample state of operation.

4. The voltage sample and hold circuit of claim 3 wherein, said second feedback circuit includes amplifier staging.

5. The voltage sample and hold circuit of claim 4 wherein, said second feedback circuit also includes series connected with said amplifier staging of said second feedback circuit, a first resistor and a second resistor subject to being connected as a series circuit in parallel with said capacitive means when said switch means closes said second feedback circuit for the hold state of operation.

6. The voltage sample and hold circuit of claim 5 wherein, a third resistor is connected between a point in said second feedback circuit between said first and second resistors and a voltage potential reference source.

7. The voltage sample and hold circuit of claim 6 wherein, the series connected portions of said second feedback circuit are serially connected, in order from said output, first, said second feedback circuit amplifier staging, second, said first resistor; and third, said second resistor.

8. The voltage sample and hold circuit of claim 7 wherein, said second feedback circuit amplifier staging provides a gain of −1.

9. The voltage sample and hold circuit of claim 1 wherein, said switch means is a relay switch, with a first throw connected as a switch for said first feedback circuit, and with a second throw connected as a switch for said second feedback circuit and to connect said amplifier circuit to said voltage source.

10. The voltage sample and hold circuit of claim 1 in a stabilized master oscillator system wherein, said stabilized master oscillator system includes a voltage controlled oscillator circuit connected to received the output of said voltage sample and hold circuit, and with said voltage controlled oscillator circuit having an output signal connection as an input to a divider circuit; said divider circuit being provided with an output connection to a discriminator circuit receiving an additional input from a reference signal source; and with said discriminator circuit having an output connection through voltage signal stabilizing means as said voltage source subject to being sampled by said sample and hold circuit.

11. The stabilized master oscillator system of claim 10 wherein, a power supply and pulse generator circuit is included having an output connection as an input to said divider circuit, and with said power supply and pulse generator circuit having an additional output connection through signal delay circuit means to actuating control means in said sample and hold circuit for said switch means.